B. H. SILLS.
FENDER FOR MOTOR CARS.
APPLICATION FILED OCT. 16, 1918.
1,301,880. Patented Apr. 29, 1919.
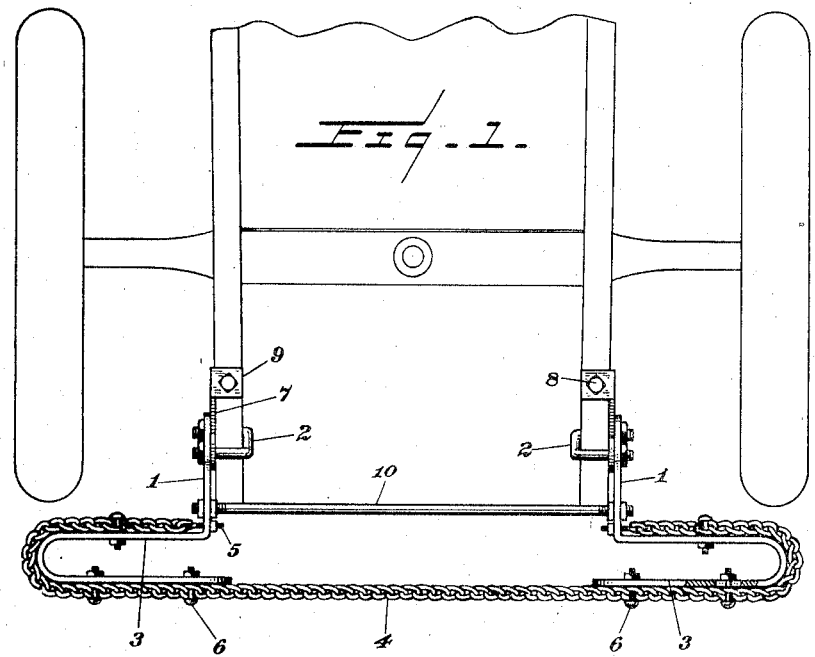
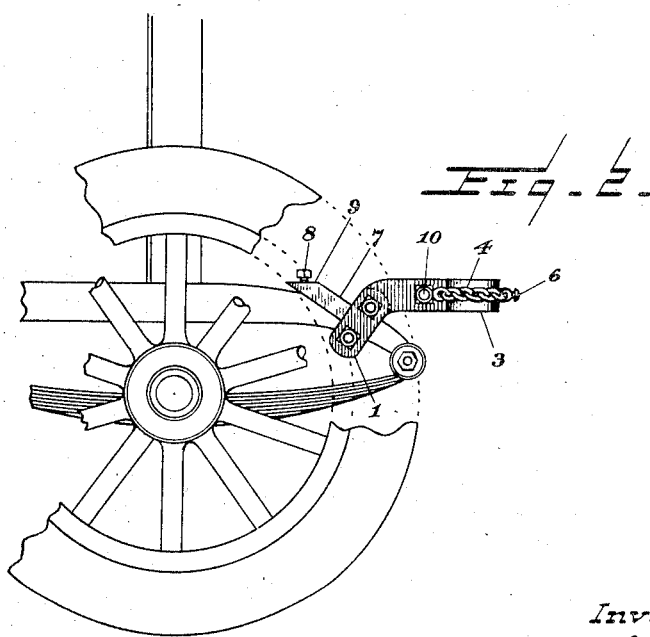
Inventor,
B. H. Sills.
By J. Edward Maybee
Atty.

UNITED STATES PATENT OFFICE.

BERTON H. SILLS, OF TORONTO, ONTARIO, CANADA, ASSIGNOR OF ONE-FOURTH TO
ABRAHAM LIPSON, OF TORONTO, CANADA.

FENDER FOR MOTOR-CARS.

1,301,880.  Specification of Letters Patent.  Patented Apr. 29, 1919.

Application filed October 16, 1918. Serial No. 258,319.

*To all whom it may concern:*

Be it known that I, BERTON H. SILLS, a resident of the city of Toronto, in the county of York, Province of Ontario, Canada, a subject of the King of Great Britain, have invented certain new and useful Improvements in Fenders for Motor-Cars, of which the following is a specification.

The object of my invention is to devise a fender for motor cars which will not only be efficient and novel in appearance as a fender, but which will provide chains for emergency use either as tire chains or as towing chains.

I attain my object by means of the constructions hereinafter described and illustrated in the accompanying drawings in which—

Figure 1 is a plan view of the front part of a motor car showing my fender in position; and Fig. 2 a side elevation of one of the spring arms and the side member of the automobile frame to which it is connected.

In the drawings like numerals of reference indicate corresponding parts in the different figures.

The device comprises a pair of arms and a chain. The arms are formed of spring metal and are provided with inner ends 1 adapted to be secured by means of clips 2 to part of the chassis of the vehicle. To prevent the arms being rocked backwardly by pressure applied to the front of the fender, I provide for each arm a brace 7 through which the clips pass, which brace is provided with a lug 9 through which a set screw 8 is threaded bearing on the vehicle chassis. By adjusting the set screws the fender may be leveled. These arms preferably curve downwardly and have the chain supports 3 formed integral therewith. These chain supports are formed by bending the end of each arm laterally and outwardly and then inwardly, the free ends preferably being substantially in line with the inner ends. The chain supports have thus a U-shape. A stay rod 10 is preferably secured at each end to the forward parts of the inner ends of the arms to brace the one from the other.

The chain 4 is connected with the arms. In the preferred arrangement bolts 5 are connected to the inner ends of the supports adjacent the arms, and to these bolts the ends of the chain are secured. From the bolts the chain passes around the U-shaped chain supports, extending from one to the other. To prevent vertical displacement of the chains I provide studs 6 which project into links of the chain. Other means might of course be provided to answer the purpose.

I am aware that constructions have been devised in which the chain is supported by resilient arms, but in such constructions the problem has been to utilize the flexibility of the chain as a shock absorber without securing too great resiliency. By giving my supports the shape shown, the chain is easily drawn tight without producing too great a bending strain on the arms, and owing to the peculiar arrangement of the chain supports, pressure against the chain is resolved into strains acting in two directions, one tending to pull the supports toward one another and the other tending to press the sides of the supports toward one another. Further, as the unsupported part of the chain is very short, any pressure against its center is considerably less effective in pulling the supports toward one another than if the unsupported part of the chain were longer. The whole device is therefore sufficiently rigid and stiff to effectively act as a fender.

Owing to the peculiar shape of the supports and the point of connection of the ends of the chain, I secure a chain of considerable length, which is adapted for use as an emergency chain or grip in the case of the car on which it is used becoming stuck in a mud hole. Further, if both front and rear fenders are provided on the car, the chains taken from the fenders and united are of sufficient length to form an effective tow line, thus not only do I secure a fender of novel appearance and great utility, but I also provide chains for emergency purposes as hereinbefore set forth.

What I claim as my invention is:—

1. A vehicle fender comprising a pair of arms having inner ends adapted for connection to the chassis of the vehicle, each arm being bent laterally and outwardly and then inwardly to form an inwardly facing U-shaped chain support; and a chain connected to said arms and extending between the supports.

2. A vehicle fender comprising a pair of arms having inner ends adapted for connection to the chassis of the vehicle, each arm being bent laterally and outwardly and then inwardly to form an inwardly facing U-shaped chain support; and a chain connected to said arms and passing around and extending between said supports.

3. A vehicle fender comprising a pair of arms having inner ends adapted for connection to the chassis of the vehicle, each arm being bent laterally and outwardly and then inwardly to form an inwardly facing U-shaped chain support; a chain connected to said arms and extending between the supports; and means preventing vertical displacement of said chain on the supports.

4. A vehicle fender comprising a pair of arms having inner ends adapted for connection to the chassis of the vehicle, each arm being bent laterally and outwardly and then inwardly to form an inwardly facing U-shaped chain support; bolts connected to said arm, a chain connected at its ends to said bolts, passing around and extending between the supports and a stay rod connected to the inner ends of said arms adjacent the chain supports.

5. A vehicle fender comprising a pair of arms having inner ends adapted for connection to the chassis of the vehicle, each arm being bent laterally and outwardly and then inwardly to form an inwardly facing U-shaped chain support; a chain connected to said arms and extending between the supports; and a stay rod connected to the inner ends of the arms adjacent the chain supports.

6. A vehicle fender comprising a pair of arms having inner ends adapted for connection to the chassis of the vehicle each arm being bent laterally and outwardly and then inwardly to form an inwardly facing U-shaped chain support; clips adapted to embrace part of the vehicle chassis and passing through the inner ends of the arms; braces through which said clips pass; a lug on each brace adapted to extend over part of the vehicle chassis; a set screw threaded through each lug; and a chain connected to said arms and extending between the supports.

7. A vehicle fender comprising a pair of arms having inner ends adapted for connection to the chassis of the vehicle, each arm being extended laterally and outwardly; and a chain connected to said arms and extending transversely of the vehicle in substantial parallelism to the outwardly extending parts of said arms.

Signed at Toronto, Canada, this 5th day of October, 1918.

BERTON H. SILLS.